United States Patent
Bhoyar et al.

(10) Patent No.: US 12,087,175 B1
(45) Date of Patent: Sep. 10, 2024

(54) AI-BASED PIANO CO-PILOT SYSTEM AND METHOD THEREOF FOR ENHANCING PIANO SKILLS

(71) Applicants: Shubhada Bhoyar, Livingston, NJ (US); Kimaya Sutone, Livingston, NJ (US); Manasvi Rajendra, Livingston, NJ (US); Asmi Barve, Livingston, NJ (US); Nishka Bansal, Livingston, NJ (US)

(72) Inventors: Shubhada Bhoyar, Livingston, NJ (US); Kimaya Sutone, Livingston, NJ (US); Manasvi Rajendra, Livingston, NJ (US); Asmi Barve, Livingston, NJ (US); Nishka Bansal, Livingston, NJ (US)

( * ) Notice: Subject to any disclaimer, the term of this patent is extended or adjusted under 35 U.S.C. 154(b) by 0 days.

(21) Appl. No.: 18/632,324

(22) Filed: Apr. 11, 2024

Related U.S. Application Data (60) Provisional application No. 63/598,979, filed on Nov. 15, 2023.

(51) Int. Cl.
G09B 15/02 (2006.01)
G09B 15/04 (2006.01)
G09B 15/08 (2006.01)

(52) U.S. Cl.
CPC ........... *G09B 15/023* (2013.01); *G09B 15/04* (2013.01); *G09B 15/08* (2013.01)

(58) Field of Classification Search
CPC ....... G09B 15/023; G09B 15/04; G09B 15/08
See application file for complete search history.

(56) References Cited

U.S. PATENT DOCUMENTS

| | | | |
|---|---|---|---|
| 7,148,414 B2 | 12/2006 | Kestenbaum et al. | |
| 7,612,278 B2* | 11/2009 | Sitrick | G10H 1/365 84/610 |
| 8,008,563 B1* | 8/2011 | Hastings | G09B 15/08 84/479 A |
| 9,390,630 B2* | 7/2016 | Daniels | G09B 9/00 |
| 10,825,432 B2 | 11/2020 | Yan et al. | |
| 11,087,636 B2* | 8/2021 | Liu | G10C 3/12 |
| 2008/0302233 A1* | 12/2008 | Ding | G09B 15/023 84/609 |
| 2011/0283867 A1* | 11/2011 | Ihara | G09B 15/08 84/478 |

(Continued)

*Primary Examiner* — Robert W Horn
(74) *Attorney, Agent, or Firm* — Haim M. Factor—1st-Tech-Ideas.com (57) ABSTRACT

A piano co-pilot system for enhancing piano skills of a student, the system comprising: a co-pilot hardware, including: a LED strip having a plurality of LED lights and a listener/interface unit, the listener/interface unit including a processor unit and a touch screen/listener device; a cloud computing center having at least one application programing interface (API) and an artificial intelligence (AI) module, with the co-pilot hardware in communication with the cloud computing center; a piano, which is a keyboard having a plurality of arranged keys; wherein the LED strip is configured on the keyboard with the plurality of LED lights configured to correspond to the plurality of arranged keys; and wherein the listener/interface unit is configured upon the piano and the touch screen/listener device is accessible for visual and tactile interface by the student.

6 Claims, 9 Drawing Sheets

(56) References Cited

U.S. PATENT DOCUMENTS

| | | | |
|---|---|---|---|
| 2015/0364122 A1* | 12/2015 | Ye | G10H 1/0016 84/478 |
| 2017/0358235 A1* | 12/2017 | Daniels | G09B 5/065 |
| 2019/0251936 A1* | 8/2019 | Hiruma | G10G 1/02 |
| 2021/0358460 A1* | 11/2021 | Wirtz | G09B 15/00 |

* cited by examiner

|  | Mode 1: Learn | Mode 2: Auto-correct | Mode 3: Playback |
|---|---|---|---|
| Student | - Start<br>- Select the song of choice from the pre-loaded library of songs<br>- Click Play | - Start<br>- Select the song of choice from the pre-loaded library of songs<br>- Select the Autocorrect mode<br>- Click start<br>- Play the song on the piano | - Start<br>- Select Playback mode<br>- Select the song to playback from the available list/history of recorded songs for the specific student |
| Co-pilot | - Illuminates lights on the LED strip corresponding to key to be played on the piano<br>- Record song as played by the student if the student enables the option, and store song played | - Cancels environmental noise from piano notes<br>- Interfaces with AI to detect pitch and notes.<br>- Screen displays mistakes made and score based on the song played by the student<br>- Stores history of the mistakes/scores versus a song | - Play the recording of the selected song<br>- Display score history if available |

AI-BASED PIANO CO-PILOT SYSTEM AND METHOD THEREOF FOR ENHANCING PIANO SKILLS

FIELD OF INVENTION AND BACKGROUND

Embodiments of the current invention are related to piano education and specifically to an AI-based piano co-pilot for enhancing piano skills.

In the specification and claim which follow the term "co-pilot system" is intended to mean a system associated with a piano, the system intended to enhance piano playing skills. As such, in the specification and claims which follow, the terms "co-pilot" and "co-pilot system" have generally interchangeable meanings. The terms "piano" and "keyboard" are used interchangeably hereinbelow and are intended to mean any instrument having keys arranged similarly to those of a piano. In the specification and claims which follow, the term "student" is intended to mean the person playing a piano, having the intention of enhancing his/her playing skills.

Acquiring a quality piano education is expensive, as noted further hereinbelow. Additionally, such an education is generally not accessible to all and mastering piano playing skills is typically an extended process. A critical aspect in achieving piano playing proficiency is practice. However, with an individual frontal piano lesson typically costing about $45-$100 per hour, supervised practice can become expensive over time and not affordable to many families.

There are various online piano tutorials available, as known in the art, including the following:

In U.S. Pat. No. 8,008,563, whose disclosure is incorporated by reference, describes Hastings describes an electronic circuit controlled inter-active multi sensory prompting and monitoring musical keyboard instrument for teaching user—as young as two years old—how to play keyboard instrument without instructor assistance. Instrument comprised of black and white keys arranged in conventional order, made of suitable translucent material that can be illuminated by lights such as LEDs. Indicated child size right-hand and left-hand palms and fingers defined by shapes, each shape made wholly or partly from suitable colored and transparent material in order to function as a colored lens illuminated by light placed underneath each shape. Fitted with integrated vibration mechanism capable of vibrating each individual finger shape or key singly or jointly. Includes flat panel display screen capable of providing related musical instruction. Electronic circuit outputs to user audio instruction coupled with appropriate functions by components to develop the skill of playing instrument, reading and responding to standard musical notation.

Kestenbaum et al, in U.S. Pat. No. 7,148,414, whose disclosure is incorporated by reference, describes a colored music notation system and a method of colorizing music notation using seven colors that are easily distinguishable from one another, representing the seven unique notes in an octave. The color of a note may be chosen from a list of colors in CMYK format, with a tolerance of plus or minus ten points, preferably plus or minus five points in attributes for any of the colors. The colors may be reproduced by any printing method, including using a conventional personal computer. The colors are easily reproducible within acceptable tolerances on a wide variety of media and with a range of printing options, can be read under various lighting conditions, and do not make written music unpleasant to the eye. The colors are also sufficiently different to allow for easy recognition of common chord combinations by the recollection of simple groups of colors. In the preferred embodiment of the invention, notes affected by an accidental [sic] are the same color as the natural note to which they are related. The invention also provides a method for applying color to the keys a keyboard instrument [sic].

In U.S. patent Ser. No. 10/825,432, whose disclosure is incorporated by reference, Bin Yan eta al describe A smart musical instrument system for replaying user performance with auto-play, electronic sound source or video, the system may include a musical instrument, a plurality of sensors, and a processing device. The plurality of sensors may be configured to obtain performance data of a user. The plurality of sensors may include a first sensor configured to obtain first performance data of the user. The performance data may include the first performance data indicating operations of a musical instrument. The processing device may be in communication with the plurality of sensors. The processing device may be configured to compare the performance data with reference music data to generate a comparison result and generate feedback based on the comparison result.

Among the shortcomings of the prior art are:
  Lack of a holistic learning approach where an aspiring pianist (i.e., "student") can be guided and corrected in real-time while playing a musical piece or a song;
  Lack of various modes and flexibility of practice modes to assist beginner and advanced student alike; and
  Light/LED placement directly on piano keys is limiting and does not allow flexibility regarding various piano configurations.

There is therefore a need for a system and a method to provide an aspiring pianist/student with a holistic learning approach which contributes to self-practice and self-learning of specific musical pieces and songs, a system having flexibility regarding various piano configurations, and which can provide feedback to complement frontal learning by teachers, mentors, and/or coaches. Such a solution would help students of all levels to learn faster, to reduce the overall cost of learning/practice over time and contribute to further motivating the aspiring pianist.

SUMMARY OF THE INVENTION

According to one aspect of the present invention, there is provided a piano co-pilot system for enhancing piano skills of a student, the system comprising: a co-pilot hardware, including: a LED strip having a plurality of LED lights and a listener/interface unit, the listener/interface unit including a processor unit and a touch screen/listener device; a cloud computing center having at least one application programing interface (API) and an artificial intelligence (AI) module, with the co-pilot hardware in communication with the cloud computing center; a piano, which is a keyboard having a plurality of arranged keys; wherein the LED strip is configured on the keyboard with the plurality of LED lights configured to correspond to the plurality of arranged keys; and wherein the listener/interface unit is configured upon the piano and the touch screen/listener device is accessible for visual and tactile interface by the student. Preferably, the processing unit is configured in close proximity with the touch screen/listener device, the processor unit and the touch screen/listener device having analog and digital communication capability. Most preferably, the LED strip is in communication with the listener/interface unit and the listener/interface unit having analog and digital audio sensing capabilities and configured to sense audio/digital output of the piano. Typically, the plurality of LED lights includes a plurality of colors, the plurality of LED lights and colors configured to prompt the student and to correspond to ones of the plurality of keys. Most typically, the co-pilot system is configured to operate with the student interfacing with the listener/interface unit in a learning mode and in an auto-correct mode. Preferably, the co-pilot system is configured to operate with the student interfacing with the listener/interface unit in a playback mode and wherein the co-pilot system is configured to operate in a new song recording configuration/sequence, in a song storage configuration/sequence, in a new song recording module, and in a note generation configuration/sequence.

According to another aspect of the present invention, there is further provided a method of operating a piano co-pilot system for enhancing piano skills of a student, the piano co-pilot system including: a co-pilot hardware having a LED strip and having a plurality of LED lights and a listener/interface unit, the listener/interface unit including a processor unit and a touch screen/listener device; a cloud computing center having at least one application programing interface (API) and an artificial intelligence (AI) module, the co-pilot hardware being in communication with the cloud computing center; a piano, which is a keyboard having a plurality of arranged keys; whereby the LED strip is positioned on the keyboard with the plurality of LED lights corresponding to the plurality of arranged keys; whereby the listener/interface unit is positioned upon the piano and the touch screen/listener device is accessible for visual and tactile interface by the student; the method comprising: operating the piano co-pilot system in a learning mode and in an auto correct mode, with the student interfacing with the listener/interface unit; operating the piano co-pilot system in a playback mode with the student interfacing with the listener/interface unit; operating the piano co-pilot system in a new song recording configuration/sequence; operating the piano co-pilot system in a song storage configuration/sequence; operating the piano co-pilot system with a new song recording module; and operating the piano co-pilot system in a note generation configuration/sequence. Preferably, the plurality of LED lights includes a plurality of colors, the plurality of LED lights and colors serve to prompt the student and to correspond to ones of the plurality of keys. Most preferably, the learning mode comprises the steps of: a song is selected from the system by the student, whereby the student interfaces with the listener/interface to choose a song that will be prompted by the co-pilot for the student to play; select tempo and color combinations, whereby the student further selects a desired song tempo and one or more desired color combinations of the plurality of LED lights for the next step; the LED strip illuminates based on song notes, whereby the student is prompted by the co-pilot system to play the chosen song with the plurality of LED lights prompting the student by sequentially lighting ones of the plurality of LED lights corresponding to ones of the plurality of keys; and the co-pilot system stores student mistakes, strengths, and practice times, whereby the co-pilot system records and stores student mistakes (incorrect key pressed versus LED light prompt), strengths (correct key pressed versus LED light prompt), and practice times, whereby a clock in the processor unit serves to track times. Most preferably, the learning mode comprises the steps of: a song is selected from the system by the student, whereby the student interfaces with the listener/interface to choose a song that will be prompted by the co-pilot for the student to play; select tempo and color combinations, whereby the student further selects a desired song tempo and one or more desired color combinations of the plurality of LED lights for the next step; the LED strip illuminates based on song notes, whereby the student is prompted by the co-pilot system to play the chosen song with the plurality of LED lights prompting the student by sequentially lighting ones of the plurality of LED lights corresponding to ones of the plurality of keys; and the co-pilot system stores student mistakes, strengths, and practice times, whereby the co-pilot system records and stores student mistakes (incorrect key pressed versus LED light prompt), strengths (correct key pressed versus LED light prompt), and practice times, whereby a clock in the processor unit serves to track times. Typically, the auto correct mode comprises the steps of: a song for feedback is selected by the student, whereby the student interfaces with the listener/interface unit to select a song previously played and recorded by the co-pilot system, to subsequently give student feedback; the co-pilot system listens to music and removes noise, the system removes noise (non-piano sounds) and saves the resultant music played by the student; listened music is converted to notes using AI based pitch-detection, whereby the resultant music is converted to music notes using AI based pitch detection; and a session review is requested by the student from the co-pilot system, whereby the student requests a session from the co-pilot, in which the LED strip lights are activated to show the student missing keys and notes. Most typically, the playback mode follows the learning mode and comprises the steps of: selecting an available song from a list/history of recorded/stored songs associated with the student; the student plays the selected recorded/stored, and if there is a stored score history associated with the selected song, the score is displayed. Preferably, the new song recording configuration/sequence comprises the steps of: sound acquisition, whereby a new song is acquired from an outside source, including radio and internet; digitize sound, whereby the acquired new song is preprocessed and digitized as digitized music; sending the digitized music to the cloud computing center and to the API, where the AI model converts the digitized music into an output, including both musical notes and LED illuminations, resulting in a note-to-LED conversion; and storing output, including the acquired new song and the note-to-LED conversion. Most preferably, the song storage configuration/sequence comprises storing prerecorded songs and new songs recorded in a new song recording module in a song storage subsystem, which is scalable, wherein the song storage subsystem is configured for file-based and NoSQL storage and wherein ones of the plurality of arranged keys and corresponding LED illumination information are stored. Typically, the song storage subsystem further serves to store other components and other articulations required to play music by the autopilot system. Most typically, the new song recording module comprises the steps of: sound acquisition, whereby a new song is acquired from an outside source, including radio and internet; digitize sound, whereby the acquired new song is preprocessed and digitized as digitized music; sending the digitized music to the cloud computing center and to the API, where the AI model converts the digitized music into an output, including both musical notes and LED illuminations, resulting in a note-to-LED conversion; using a note comparison module to compare the output from the AI model with notes stored in a note storage and outputting comparison results; and using a note difference color coder to process output comparison results of the note comparison module to yield LED indications having colored coding to give feedback to the student.

LIST OF DRAWINGS

The invention is described herein, by way of example only, with reference to the accompanying drawings, wherein.

DETAILED DESCRIPTION

Embodiments of the current invention are related to piano education and specifically to an AI-based piano co-pilot for enhancing piano skills. Embodiments of the current invention include, but are not limited to, a device connected to a keyboard or to a piano, the device having varying configurations/sizes matching different sizes of pianos/keyboards. The device is interconnected with AI to detect pitch and notes played on the piano, as described hereinbelow.

Figure 1A:
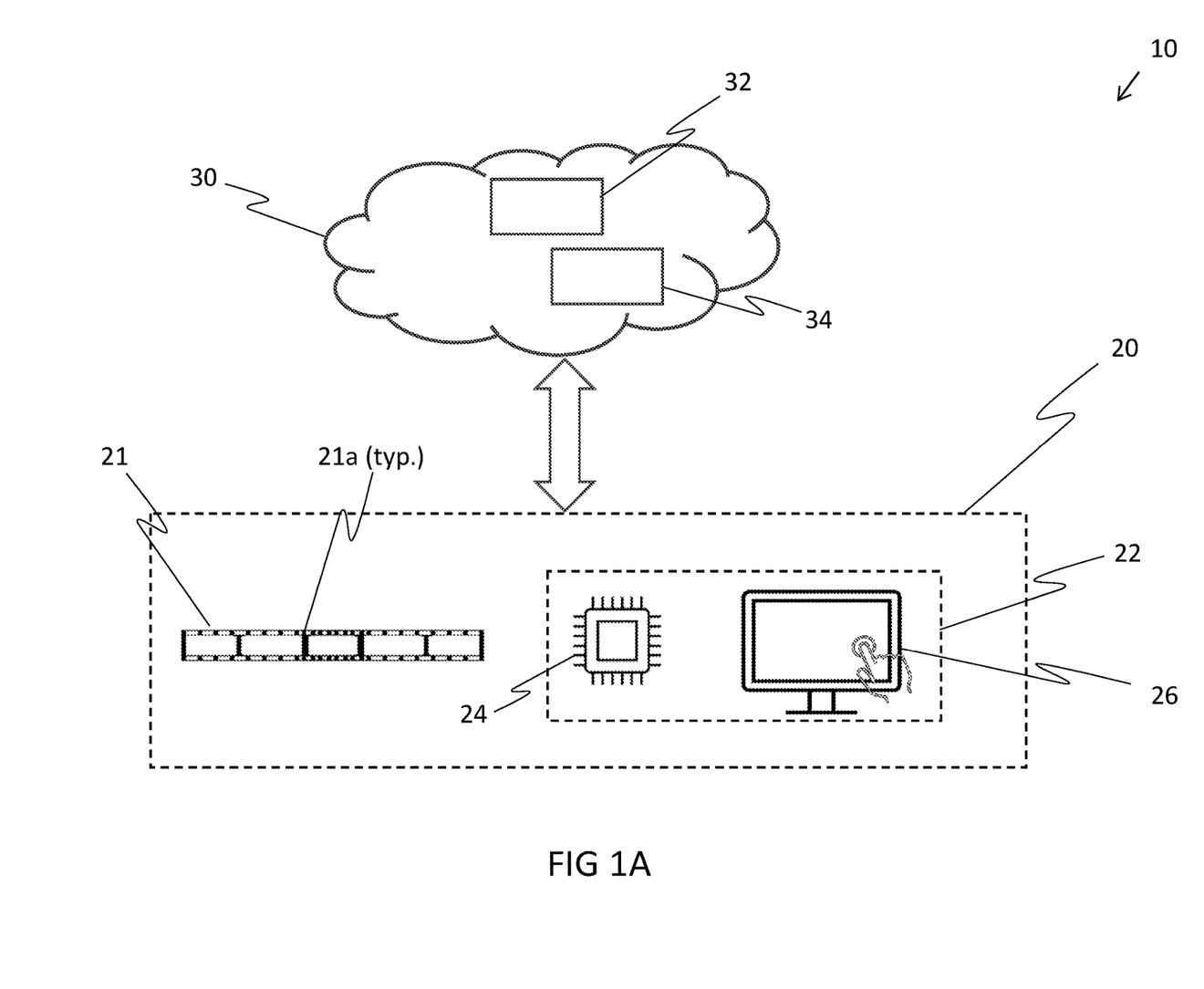
FIGS. 1A and 1B are block diagram representations of components of a co-pilot for enhancing piano skills, in accordance with embodiments of the current invention.
Figure 1B:
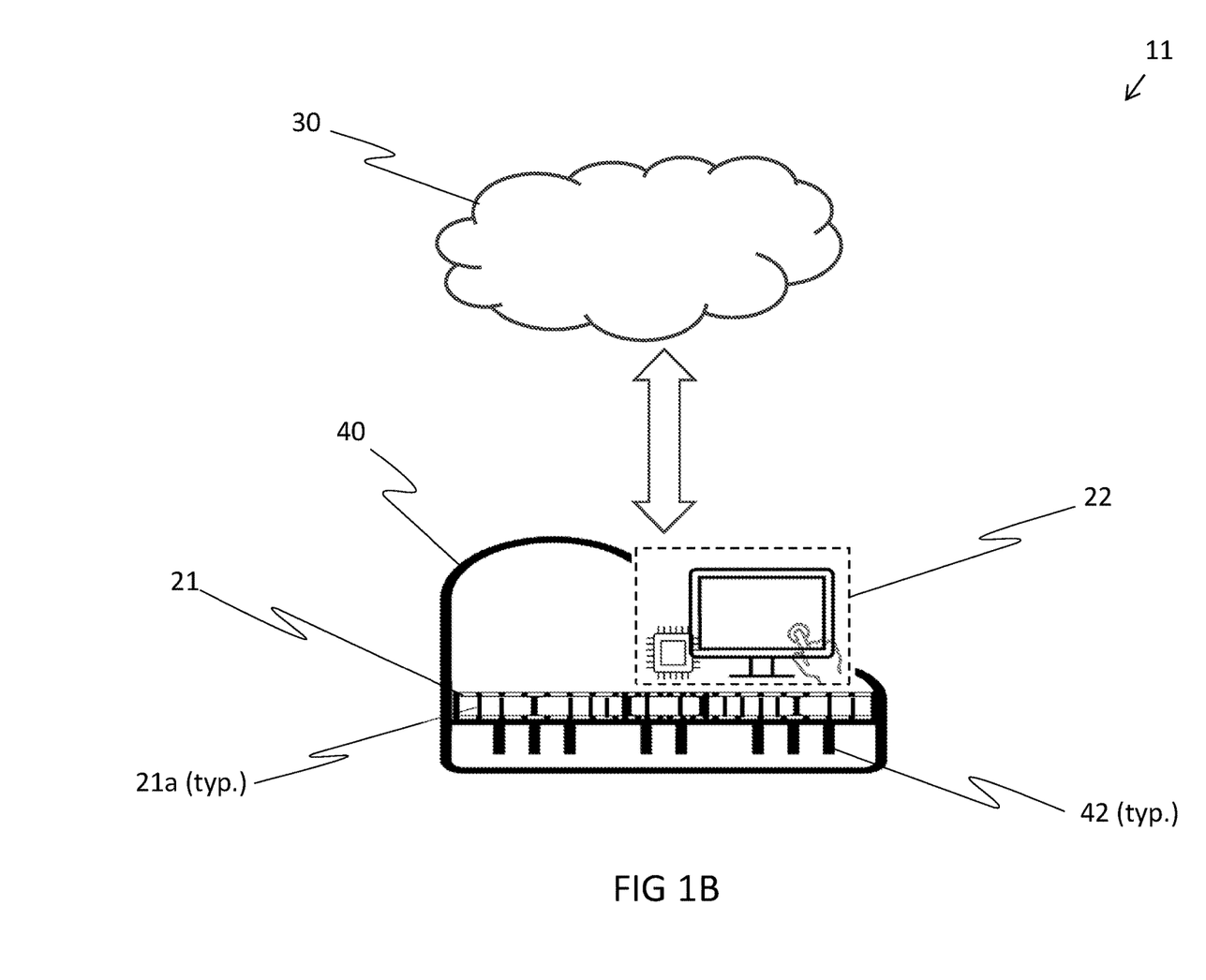

Reference is currently made to FIGS. 1A and 1B, which are block diagram representations of components 10 of a co-pilot system 11 for enhancing piano skills, in accordance with embodiments of the current invention. Components 10 include: a co-pilot hardware 20; and a cloud computing center 30. The co-pilot hardware includes: a LED strip 21; and a listener/interface unit 22, which includes a processor unit 24 and a touch screen/listener device 26. As shown in the referenced figure, co-pilot hardware 20 is configured to be in communication with cloud computing center 30, typically, but not exclusively wirelessly.

Referring to FIG. 1B, copilot system 11 further includes a piano 40 having a plurality of keys 42. LED strip 21, having a plurality of LED lights 21a is configured on piano 40 and the LED strip and the plurality of LED lights is further configured to correspond to the plurality of keys, as shown schematically in FIG. 1B. Plurality of LED lights 21a includes a plurality of colors. Listener/interface unit 22 is configured upon the piano so that touch screen/listener device 26 is accessible for visual and tactile interface by a student typically playing the piano. Listener/interface unit 22 is additionally configured to sense audio/digital output (i.e., "listen") to the piano—the listener/interface having analog and digital audio sensing capabilities, as known in the art—as described further hereinbelow. As noted hereinabove, whereas piano 40 in FIG. 1B schematically represents a conventional piano, the terms "piano" and "keyboard" are used interchangeably hereinbelow and are intended to mean any instrument having keys arranged similarly to those of a piano. As such, electronic organs and other similar instruments having a keyboard are included in the meaning of "piano", as used hereinbelow.

Embodiments of the current invention include processor unit 24 configured within or in close proximity with touch screen/listener device 26, and the processor unit and the touch screen/listener device both having analog and digital communication capability and having a connection to a power source (not shown in the figures), as known in the art. Additionally, LED strip 21 is in communication with listener/interface unit 22 via wired and/or unwired communication and has a connection to the power source.

As shown in FIGS. 1A and 1B, listener/interface unit 22, and specifically processor unit 24, is in communication with a cloud computing server 30 via wired and/or unwired connections, as known in the art. Cloud computing center 30 has a plurality of advanced computing features, including, but not limited to at least one Application Programming Interface (API) 32 and an artificial intelligence (AI) module 34, as described further hereinbelow. Whereas AI module 34 is further described hereinbelow, at least one API 32 typically represents a plurality of interfaces/modules available on cloud computing center 30.

Figure 2:
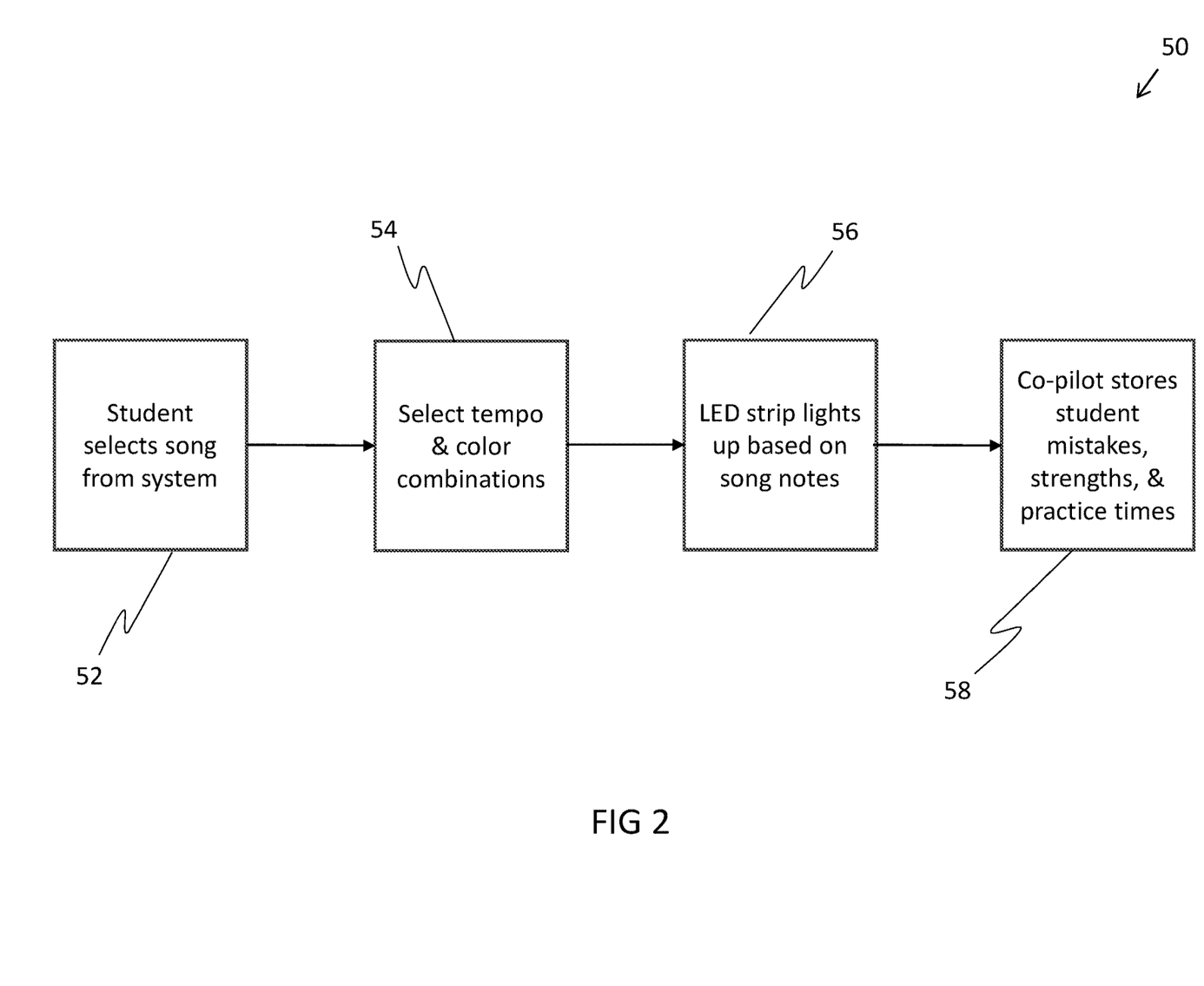
FIGS. 2 and 3 are flow charts respectively showing steps in a learning mode and in an auto-correct mode, using the co-pilot in accordance with embodiments of the current invention.
Figure 3:
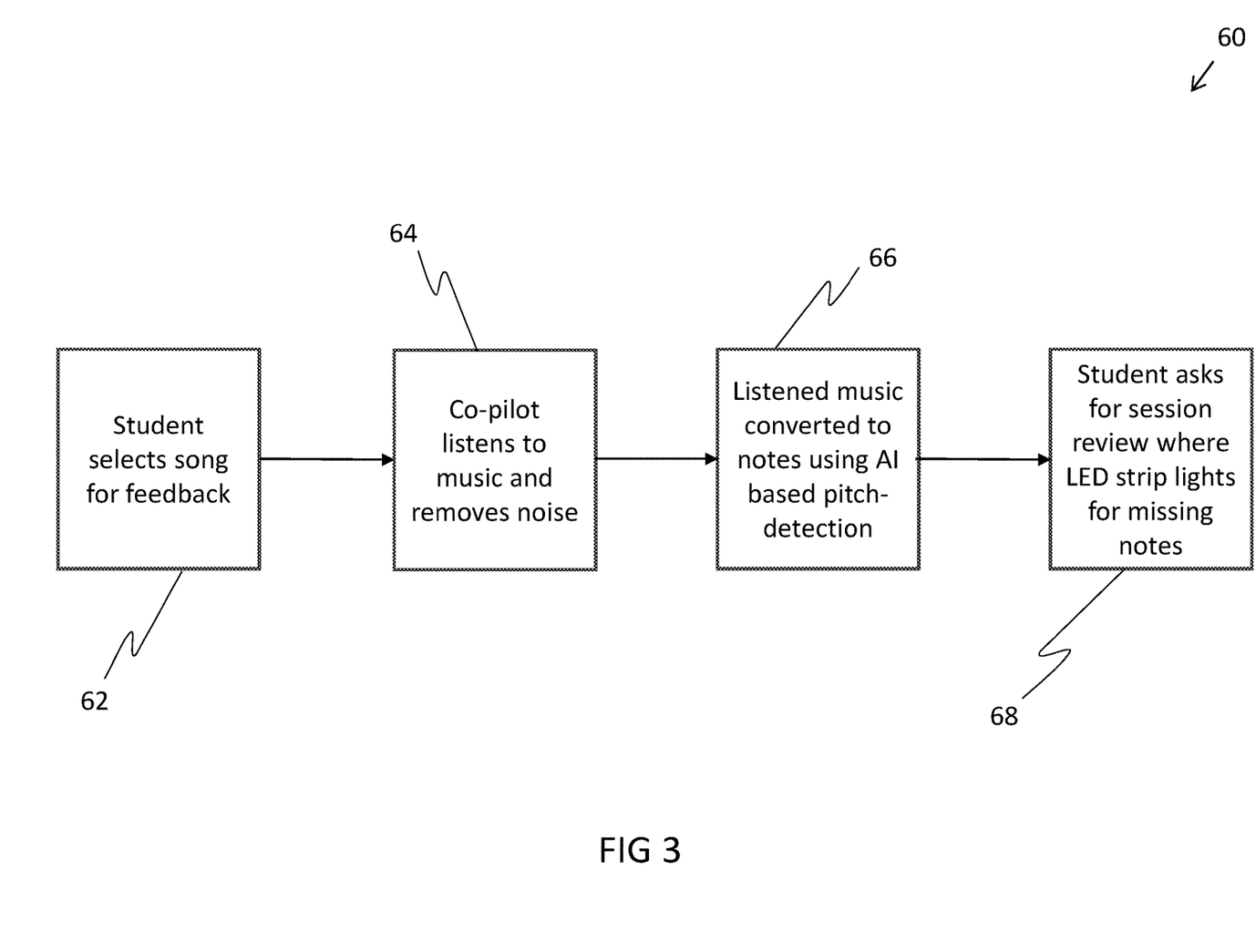

Reference is currently made to FIGS. 2 and 3, which are flow charts respectively showing steps in a learning mode 50 and in an auto-correct mode 60, using the co-pilot in accordance with embodiments of the current invention.

Learning mode 50 begins with step 52, "Student selects a song from system", the student interfaces with the listener/interface unit (ref FIGS. 1A and 1B) to choose a song that will be prompted by the co-pilot for the student to play. In step 54, "Select tempo & color combinations", the student further selects a desired song tempo and one or more desired color combinations of the plurality of LED lights for the next step. In step 56, "LED strip illuminate based on song notes", the student is prompted by the co-pilot to play the chosen song with the plurality of LED lights (and any chosen color combination) prompting the student by sequentially lighting ones of the plurality of LED lights corresponding to ones of the plurality of keys. (Refer to FIGS. 1A and 1B hereinabove.) In step 58, "Co-pilot stores student mistakes, strengths, & practice times", the co-pilot records and stores student mistakes (i.e., incorrect key pressed versus LED light prompt), strengths (i.e., correct piano key pressed versus LED light prompt), and practice times, wherein a clock in the processor unit serves to track times.

Auto-correct mode 60 (ref FIG. 3) begins with step 62, "Student selects song for feedback", the student interfaces with the listener/interface unit (ref FIGS. 1A and 1B) to select a song previously played and recorded by the co-pilot, to subsequently give student feedback, as described hereinbelow. In step 64, "Co-pilot listens to music and removes noise", the system removes noise (i.e., non-piano sounds) as known in the art, and saves the resultant music. In step 66, "Listened music converted to notes using AI based pitch-detection", the resultant music (i.e., following noise removal) is converted to music notes using AI based pitch detection, as further described hereinbelow. Finally, in step 68, "Student asks for session review where LED strip illuminates for missing notes", the student requests a session from the co-pilot, in which the LED strip lights are activated to show the student missing keys and notes.

Figure 4:
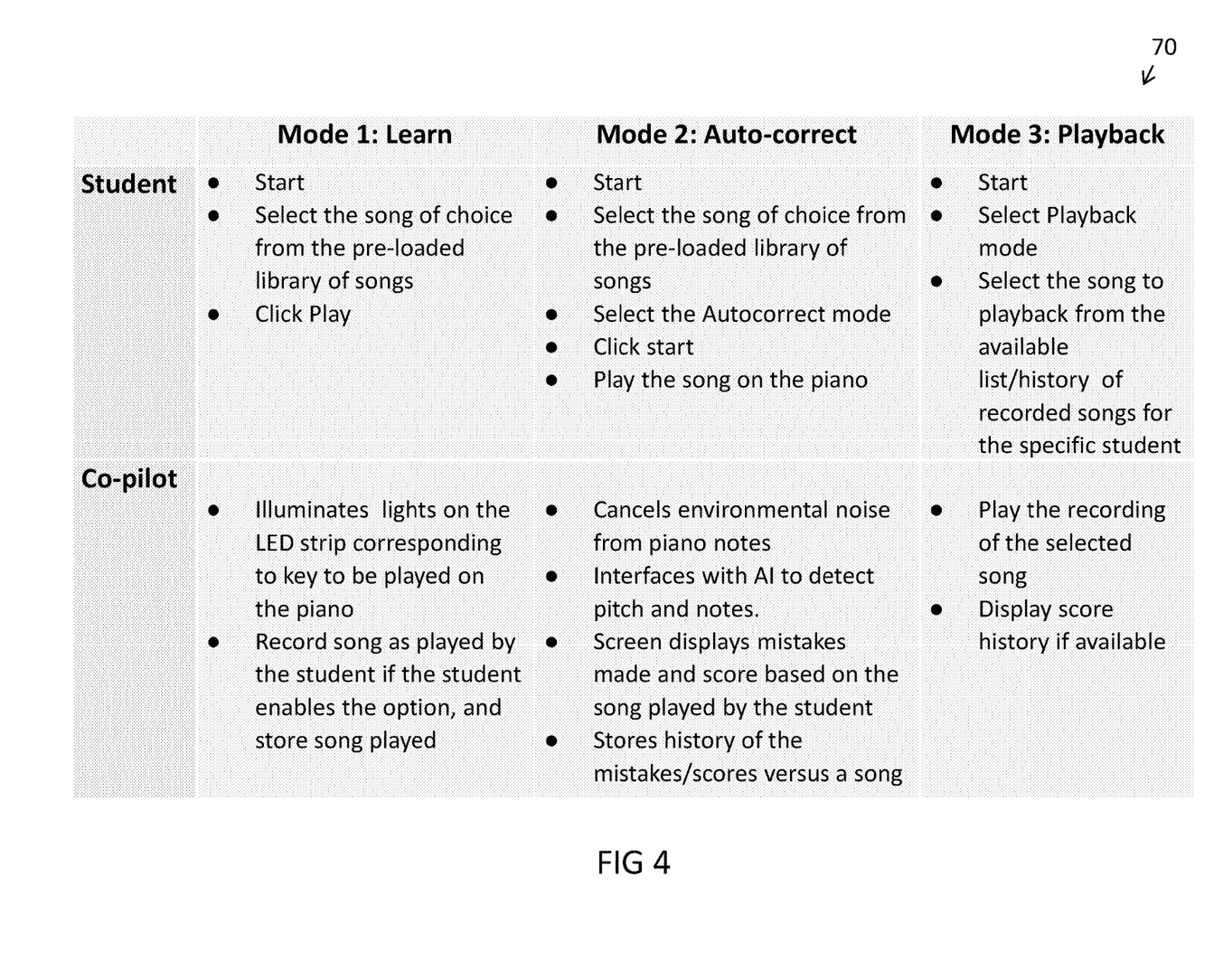
FIG. 4 is a textual table summarizing three modes of operation of the co-pilot versus student and co-pilot actions, in accordance with embodiments of the current invention.

Reference is currently made to FIG. 4, which is a textual table summarizing three modes of operation of the co-pilot system versus student and co-pilot actions, in accordance with embodiments of the current invention. It is seen in FIG. 4 that "Mode 1" and "Mode 2" correspond, respectively, to learning mode 50 and auto-correct mode 60 of FIGS. 2 and 3 above. Mode 3, Playback is associated with the description above of learning mode 50, and specifically following step 58 hereinabove. Once playback mode is selected, an available song from a list/history of recorded/stored songs associated with a specific student is selected. The student then plays the selected recorded/stored song. If there is a stored score history associated with the chosen song, the score history is displayed.

FIGS. 1A, 1B, and 2-4 hereinabove illustrate and serve to describe structure and functionalities of the co-pilot system. The figures presented hereinbelow serve to illustrate and serve to describe modules of the co-pilot system which enable the functionalities described hereinabove.

Figure 5:
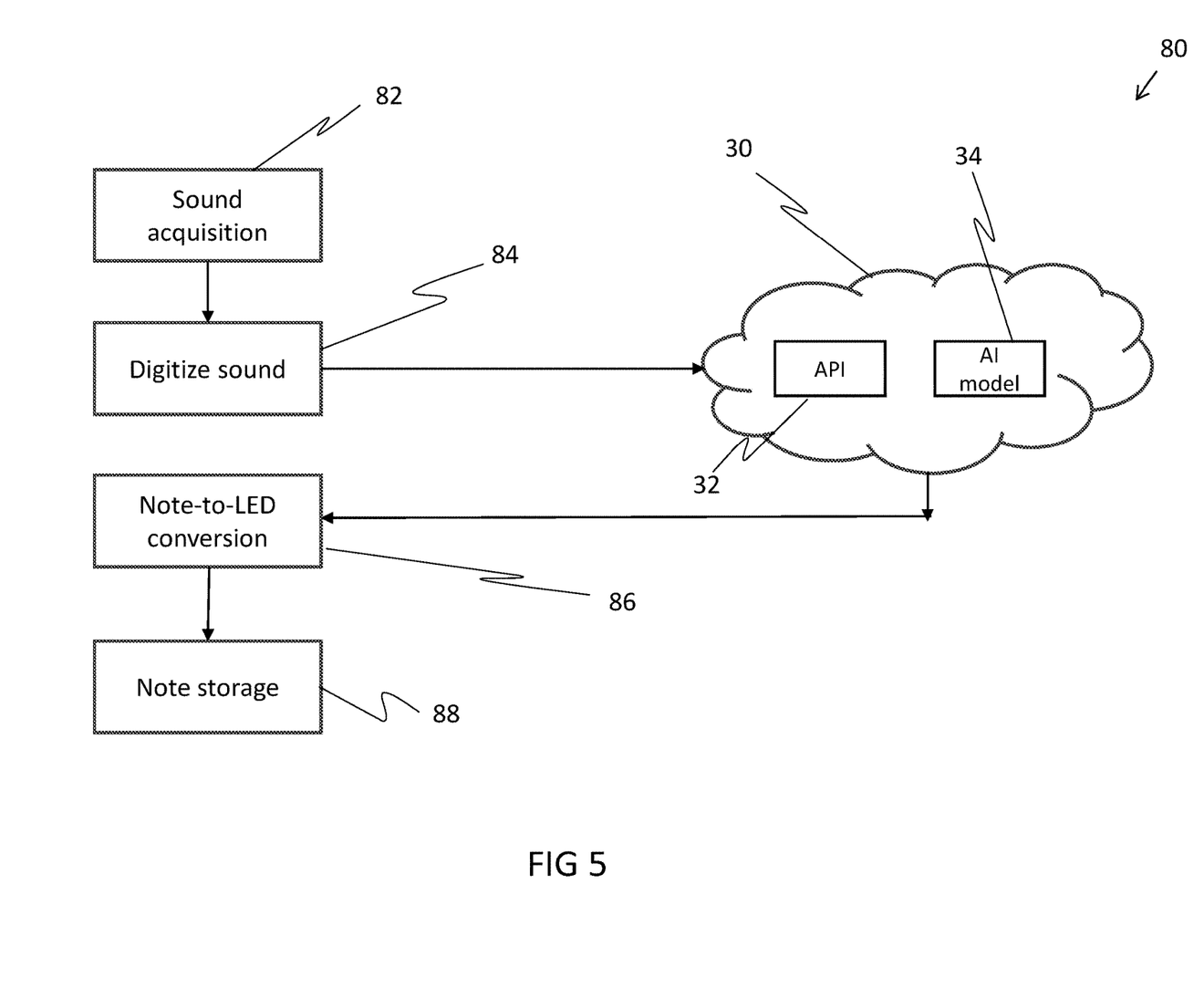
FIG. 5 is a flow chart representation of a new song recording module of the co-pilot system, in accordance with embodiments of the current invention.
Figure 6:
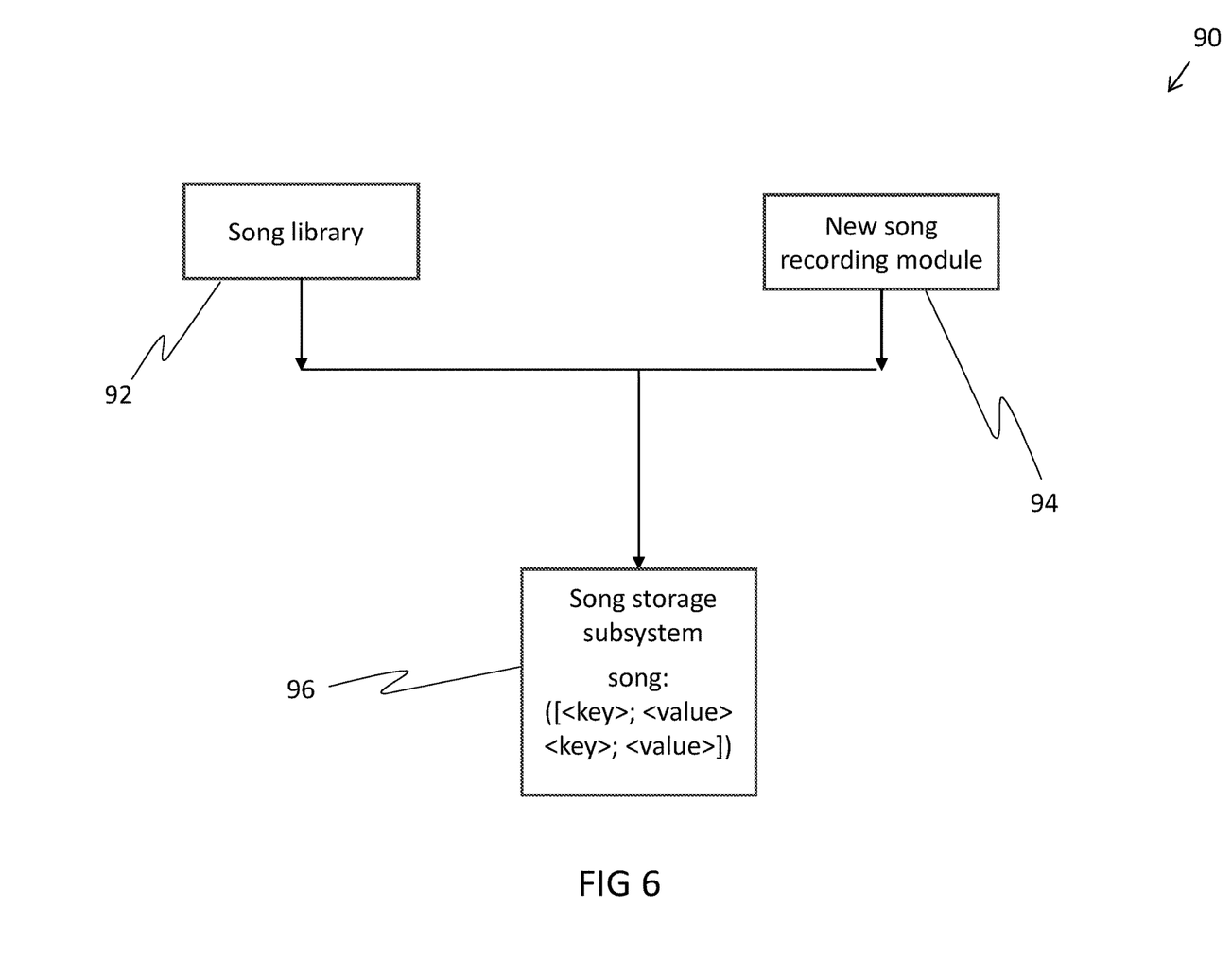
FIG. 6 is a block diagram representation of a song storage module of the co-pilot system, in accordance with embodiments of the current invention.
Figure 7:
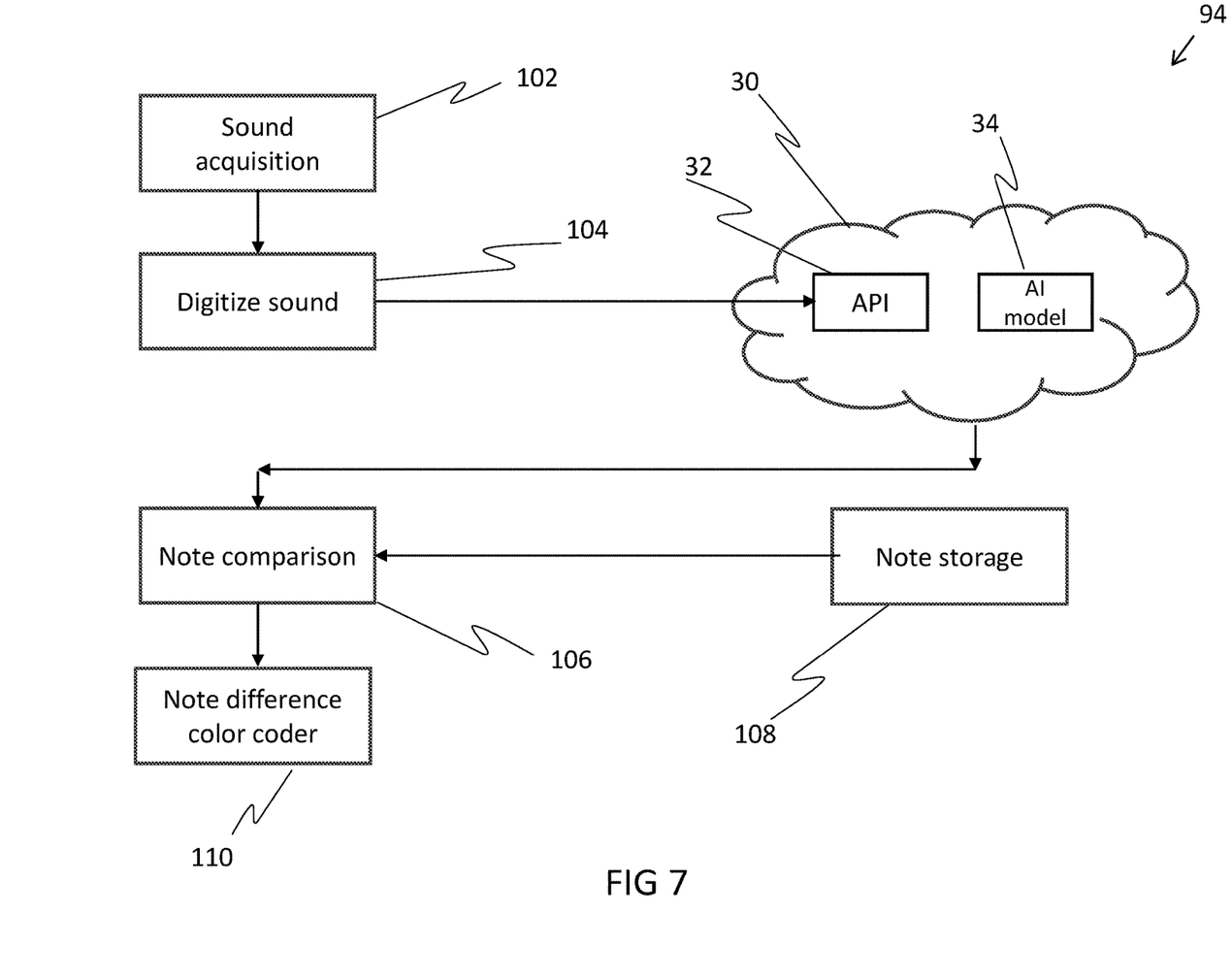
FIG. 7 is a block chart representation of the new song recording module of FIG. 6, in accordance with embodiments of the current invention.

Elements indicated by the same indicia in FIGS. 5, 6, and 7 are generally identical in configuration, operation, and functionality as described hereinabove in FIGS. 1A and 1B.

Reference is currently made to FIG. 5, which is a flow chart representation of a new song recording configuration/sequence 80 of the co-pilot system, in accordance with embodiments of the current invention. The co-pilot system has a pre-recorded library of songs; however, some students would like to learn additional songs or new (i.e., recently published) songs.

New song recording configuration/sequence 80 includes the steps described hereinbelow, starting with step 82, "sound acquisition" whereby a new song is acquired from an outside source, such as but not limited to radio and internet. In step 84, "digitize sound", the acquired song is preprocessed and digitized (unless it is already acquired in digitized form). Then, the digitized song/music is sent to cloud computing center 30 and to API 32 (as noted in FIG. 1A hereinabove), where AI model 34 is used to convert the digitized music into an output including both musical notes and LED illuminations—the latter similar to the description hereinabove in step 56 of FIG. 2. The result is step 86, "note-to-LED conversion". In step 88, "note storage", outputs are stored, including the initial music/sound acquired in step 82, and the notes and LED illuminations generated hereinabove.

Reference is currently made to FIG. 6, which is a block diagram representation of a song storage configuration/sequence 90 of the co-pilot system, in accordance with embodiments of the current invention. Song storage configuration/sequence 90 includes a song library 92, which stores prerecorded songs and a new song recording module 94 (described further hereinbelow) which includes new songs. Songs from both song library 92 and new song recording module 94 are stored in a song storage subsystem 96, which is scalable. Storage in song storage subsystem 96 can be file-based or NoSQL storage as known in the art, where piano keys and LED illumination information are stored as key-value pairs, as shown in the figure. In addition to serving to store LED illumination information, song storage subsystem 96 serves to store other components of music, such as: tempo; rests; and other articulations required to play music by the auto-pilot system.

Reference is currently made to FIG. 7, which is a flow chart representation of new song recording module 94 of FIG. 6, in accordance with embodiments of the current invention. Similar to the description of auto-correct configuration/sequence 60 in FIG. 3 hereinabove, a student may play a song which is recorded. A sound acquisition module 102 serves to record the song (also called "music" below), then digitized in a digitize sound module 104 and then converted into music notes—as described hereinabove, in FIG. 5.

Note conversion is performed by sending the digitized music to cloud 30 and to API 32 where AI model 34 is used to convert the digitized music into musical notes. The musical note output of cloud 30 is compared in a note comparison module 106 with notes stored in a note storage 108. Note comparison module 106 then outputs LED indications having colored coding to give feedback to the student. A note difference color coder 110 is responsible for LED color coding.

For example, if the student chose a red LED color to indicate a mistake and a green LED color to indicate a correct note, a given song will be played with the LED strip on the piano showing a red color for the mistaken keys played by the student. When a student learns piano with an instructor, most of the time is spent in instructional feedback where the instructor confirms whether the student is playing music correctly or not. Of course, if a student practices without an instructor and without any feedback, he may not know whether he is playing music correctly or not. Embodiment of the current invention in the practice mode described hereinabove efficiently provides feedback and serves to significantly reduce the time required to learn new songs.

Figure 8:
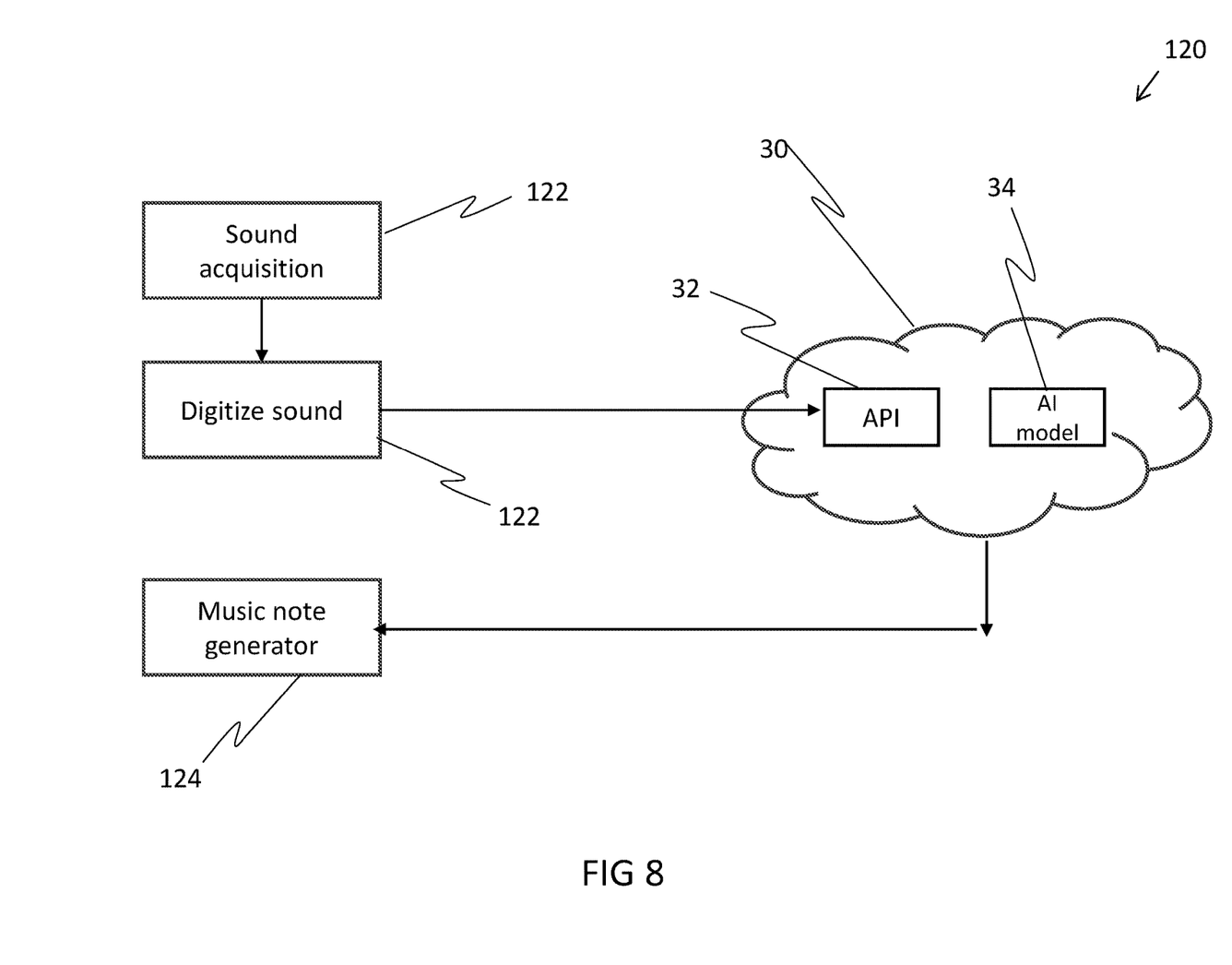
FIG. 8 is a block diagram of a note generation module of the co-pilot system, in accordance with embodiments of the current invention.

Reference is currently made to FIG. 8, which is a block diagram of a note generation configuration/sequence 120 of the co-pilot system, in accordance with embodiments of the current invention.

The student not only needs to know how to play a song but also needs to be able to read musical notes. Using the auto-pilot system, students can play music which is processed and converted into notes. Note generation configuration/sequence 120 is responsible for generating music notes, for example as described hereinabove in auto correct mode 60 in FIG. 3 and also in FIG. 7.

Whereas prior art music-to-note converters exist, they are limited regarding accuracy. The AI-based solution employed in embodiments of the current invention serves to effectively handle noise and to generate notes more accurately, contributing to improving an overall musical experience for the student.

Note generation module 120 includes a sound acquisition module 122, which serves to record music. Once recorded, the music (i.e. "song") is digitized in a digitize sound module 124, as described hereinabove in FIG. 7. The digitized song is forwarded to cloud 30, API 32, and to AI model 34 to converted music notes as described in FIGS. 5 and 7 hereinabove. In the current case, music notes are sent to a music note generator 124.

It will be appreciated that the above descriptions are intended only to serve as examples, and that many other embodiments are possible within the scope of the present invention and as defined in the appended claims.

The invention claimed is:

1. A method of operating a piano co-pilot system for enhancing piano skills of a student, the piano co-pilot system including:
   a co-pilot hardware having a LED strip and having a plurality of LED lights and a listener/interface unit, the listener/interface unit including a processor unit and a touch screen/listener device;
   a cloud computing center having at least one application programing interface (API) and an artificial intelligence (AI) module, the co-pilot hardware being in communication with the cloud computing center,
   a piano, which is a keyboard having a plurality of arranged keys;
   whereby the LED strip is positioned on the keyboard with the plurality of LED lights corresponding to the plurality of arranged keys;
   whereby the listener/interface unit is positioned upon the piano and the touch screen/listener device is accessible for visual and tactile interface by the student;

the method comprising:
- operating the piano co-pilot system in a learning mode and in an auto correct mode, with the student interfacing with the listener/interface unit;
- operating the piano co-pilot system in a playback mode with the student interfacing with the listener/interface unit;
- operating the piano co-pilot system in a new song recording configuration/sequence;
- operating the piano co-pilot system in a song storage configuration/sequence;
- operating the piano co-pilot system with a new song recording module; and
- operating the piano co-pilot system in a note generation configuration/sequence;

whereby the plurality of LED lights includes a plurality of colors, the plurality of LED lights and colors serve to prompt the student and to correspond to ones of the plurality of keys;

whereby the learning mode comprises the step of:
- a song is selected from the system by the student, whereby the student interfaces with the listener/interface to choose a song that will be prompted by the co-pilot for the student to play;
- select tempo and color combinations, whereby the student further selects a desired song tempo and one or more desired color combinations of the plurality of LIED lights for the next step;
- the LED strip illuminates based on song notes, whereby the student is prompted by the co-pilot system to play the chosen song with the plurality of LED lights prompting the student by sequentially lighting ones of the plurality of LED lights corresponding to ones of the plurality of keys; and
- the co-pilot system stores student mistakes, strengths, and practice times, whereby the co-pilot system records and stores student mistakes (incorrect key pressed versus LED light prompt), strengths (correct key pressed versus LED light prompt), and practice times, whereby a clock in the processor unit serves to track times;

whereby the auto correct mode comprises the steps of:
- a song for feedback is selected by the student, whereby the student interfaces with the listener/interface unit to select a song previously played and recorded by the co-pilot system, to subsequently give student feedback;
- the co-pilot system listens to music and removes noise, the system removes noise (non-piano sounds) and saves the resultant music played by the student;
- listened music is converted to notes using AI based pitch-detection, whereby the resultant music is converted to music notes using AI based pitch detection; and
- a session review is requested by the student from the co-pilot system, whereby the student requests a session from the co-pilot, in which the LED strip lights are activated to show the student missing keys and notes.

2. The method of operating a piano co-pilot system according to claim 1, whereby the playback mode follows the learning mode and comprises the steps of:
- selecting an available song from a list/history of recorded/stored songs associated with the student;
- the student plays the selected recorded/stored, and if there is a stored score history associated with the selected song, the score is displayed.

3. The method of operating a piano co-pilot system according to claim 2, whereby the new song recording configuration/sequence comprises the steps of:
- sound acquisition, whereby a new song is acquired from an outside source, including radio and internet;
- digitize sound, whereby the acquired new song is preprocessed and digitized as digitized music;
- sending the digitized music to the cloud computing center and to the API, where the AI model converts the digitized music into an output, including both musical notes and LED illuminations, resulting in a note-to-LED conversion; and
- storing output, including the acquired new song and the note-to-LED conversion.

4. The method of operating a piano co-pilot system according to claim 3, whereby the song storage configuration/sequence comprises storing prerecorded songs and new songs recorded in a new song recording module in a song storage subsystem, which is scalable,
- wherein the song storage subsystem is configured for file-based and NoSQL storage and wherein ones of the plurality of arranged keys and corresponding LED illumination information are stored.

5. The method of operating a piano co-pilot system according to claim 4, whereby the song storage subsystem further serves to store other components and other articulations required to play music by the auto-pilot system.

6. The method of operating a piano co-pilot system according to claim 5, whereby operating the new song recording module comprises the steps of:
- sound acquisition, whereby a new song is acquired from an outside source, including radio and internet;
- digitize sound, whereby the acquired new song is preprocessed and digitized as digitized music;
- sending the digitized music to the cloud computing center and to the API, where the AI model converts the digitized music into an output, including both musical notes and LED illuminations, resulting in a note-to-LED conversion;
- using a note comparison module to compare the output from the AI model with notes stored in a note storage and outputting comparison results; and
- using a note difference color coder to process output comparison results of the note comparison module to yield LED indications having colored coding to give feedback to the student.

* * * * *